United States Patent Office 3,790,463
Patented Feb. 5, 1974

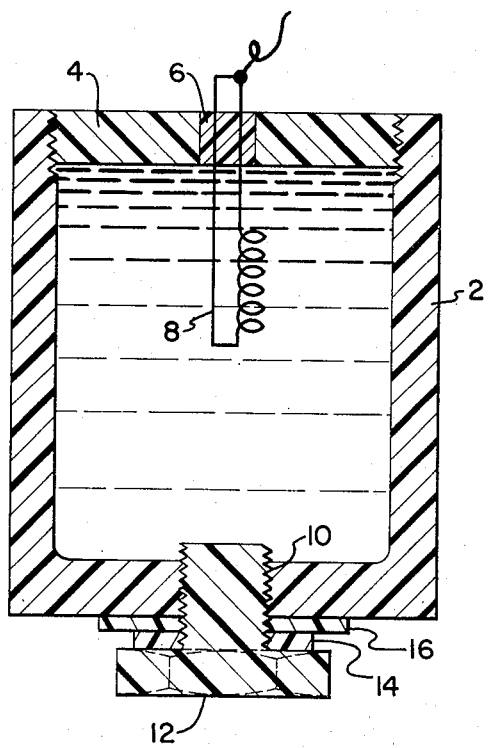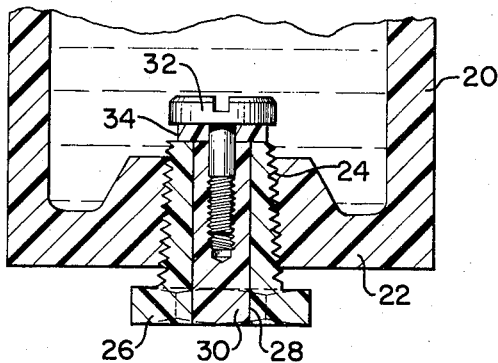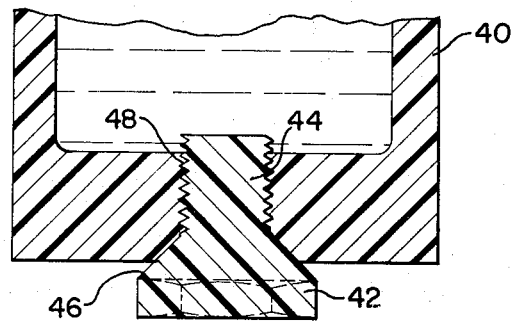

3,790,463
pH REFERENCE ELECTRODE
Arthur E. Gealt, Philadelphia, Pa., assignor to
Honeywell Inc., Minneapolis, Minn.
Filed Aug. 30, 1972, Ser. No. 285,014
Int. Cl. G01n 27/30
U.S. Cl. 204—195 F                10 Claims

ABSTRACT OF THE DISCLOSURE

A pH reference electrode having a liquid junction formed by adjacent separable structural electrode elements having different coefficients of thermal expansion whereby to automatically change the cross-sectional area of the liquid junction in response to change in environmental temperature to control the flow of electrolyte out of the reference electrode, while facilitating cleaning of the liquid junction.

BACKGROUND OF THE INVENTION

The present invention relates to pH reference electrodes. More specifically, the present invention is directed to an improved pH reference electrode including means for automatically adjusting the rate of flow of electrolyte out of the electrode.

The silver-silver chloride reference electrode is commonly used to complete the electrical measuring circuit of a pH measuring system using a glass membrane pH electrode. The primary purpose of the reference electrode is to interface a metallic external circuit with the sample to be tested with a constant interface potential. This requires the electrode to provide an interface solution of constant electrochemical activity. In the silver-silver chloride electrode this is accomplished by means of an internal filling of the electrode by a predetermined solution connected to the external sample solution through a salt bridge or liquid junction. In the silver-silver chloride reference electrode the most common internal solution is a potassium chloride solution saturated with silver chloride. The internal solution is maintained within the electrode under a hydrostatic head to assure a small but continuous outflow of electrolyte at the liquid junction with a fluid reservoir being arranged to hold a substantial amount of electrolyte to provide for a long pH measuring service. Liquid junctions have been made in many forms, e.g., a small bore tube, a thread of asbestos fiber, a pallidium wire, a plug of bamboo or other porous wood, a porous ceramic plug and a ground glass sleeve joint. Double junctions arranged in a stacked configuration have also been used with intermediate fills of electrolyte to reduce the silver chloride concentration at the outer, or sample contacting, junction.

The reference electrode is either a pressurized or non-pressurized structure. The pressurized electrode has the advantage of preventing an intruding contaminent from altering the composition of the internal junction while maintaining the salt bridge liquid junction flow. Its disadvantages, however, are that it requires a large internal electrolyte reservoir and periodic maintenance to assure continued supply of electrolyte with means for applying pressure to the electrolyte above that of the fluid sample being tested. To reduce the frequency of servicing, salt bridge junctions are often chosen for low electrolyte flow by using small openings that, however, can quickly clog. The non-pressurized electrode, on the other hand, offers freedom from pressurizing equipment and is packed with a substantial charge of salt with the electrolyte flow being developed only by diffusion through the liquid junction with an electrode life of moths or years. With only diffusion to produce electrolyte flow, the salt bridge area may be larger whereby clogging is reduced. However, diffusion works both ways, and a process fluid can enter the electrode carrying contaminants which ultimately find their way to the internal junction. Further, in sealed electrodes, when the salt bridge does clog, cleaning techniques are limited to the outside surfaces only.

When the conventional electrode is used in process monitoring applications in which pressure or temperature of the electrode environment is cyclically variable, electrolyte flow is no longer controlled by diffusion. If the reference electrode has air trapped in it, external pressures will drive process fluids in through the liquid junction until the trapped air is compressed to the process pressure and, when relieved, the compressed internal air will drive electrolyte out. Similarly, when the temperature of the external environment rises, electrolyte expands faster than the electrode outer shell and is, accordingly, driven out of the reference electrode. On cooling, the process fluid is subsequently forced in through the liquid junction by a partial vacuum within the reference electrode. The presence of any water vapor in the reference electrode also produces a positive internal pressure with increasing temperatures whereby the electrolyte is driven out of the reference electrode by the water vapor pressure. Coupled with the relatively large area liquid junction, these pressures have been found to virtually empty the reference electrode leaving the reference electrode open circuited. While some designs have minimized this effect by tightly restricting the liquid flow path through the liquid junction, these prior art reference electrodes have an undesirable high electrode electrical impedance coupled with easy clogging and problems in cleaning the liquid junction. Accordingly, it is desirable to provide a reference electrode structure having means for restricting the flow of electrolyte from the reference electrode and contaminating fluids into the electrode at all temperatures within the operating range of the electrode while affording means for cleaning of the liquid junction path.

An object of the present invention is to provide an improved pH reference electrode having means for automatically restricting the flow of electrolyte from the reference electrode to a predetermined amount within the operating range of the electrode.

Another object of the present invention is to provide an improved pH reference electrode having means for facilitating the cleaning of the liquid junction of the reference electrode.

A further object of the present invention is to provide an improved pH reference electrode having means for automatically restricting the flow of contaminants from a sample being tested into the electrode within the operating range of the electrode.

SUMMARY OF THE INVENTION

In accomplishing these and other objects, there has been provided, in accordance with the present invention, a pH reference electrode having a liquid junction formed between a threaded plug inserted in one end of a hollow shell defining a reference electrode and the shell of the referenced electrode. The material of the plug and the shell of the referenced electrode are made of materials selected for predetermined coefficients of thermal expansion whereby the liquid junction is affected by the thermal expansion of the adjacent materials to produce a variable liquid junction area inversely proportional to the temperature of the environment surrounding the reference electrode.

BRIEF DESCRIPTION OF THE DRAWINGS

A better understanding of the present invention may be had when the following detailed description is read in connection with the accompanying drawings in which:

FIG. 1 is a pictorial illustration of a cross-section of a reference electrode embodying the present invention;

FIG. 2 is a cross-section of the liquid junction portion of a reference electrode and embodying a modification of the structure of the present invention shown in FIG. 1 and FIG. 3 is a cross-section of the liquid junction portion of a reference electrode and embodying a second modification of the structure of the present invention shown in FIG. 1.

DETAILED DESCRIPTION

Referring to FIG. 1 in more detail, there is shown a pH reference electrode having an outer shell 2, e.g., a hollow cylinder, made from an electrically insulatng material. The hollow shell 2 is internally threaded at one end thereof to receive a threaded cover 4 for forming a fluid-tight seal with the shell 2. The threaded cover 4 is arranged to have a hole 6 therein for admitting wires to provide an electrical connection to a chloridized silver wire 8. The wire 8 is suspended in a solution of potassium chloride saturated with silver chloride filling the interior volume of the shell 2 in a conventional manner. The other end of the shell 2 is provided with an integral closed end having a threaded hole 10 therein. A screw 12 having a head with a diameter substantially greater than the threaded shank of the screw 12 is positioned within the threaded hole 10 with a pair of washers 14 and 16 being mounted on the screw 12 and held between the headed end of the screw 12 and the outside surface of the closed end of the shell 2. The shell 2 and the screw 12 are both made of a material having a low coefficient of thermal expansion, e.g., glass-filled polysulfone.

On the other hand, the first washer 14 is made from a high coefficient of thermal expansion material, e.g., unfilled polytetrafluoroethylene. The second washer 16 is a compressible porous washer used to provide a liquid junction path. This arrangement of materials is effective to provide a liquid junction path through the compressible porous washer 16 which path is variable in accordance with the temperature of the environment surrounding the reference electrode. Thus, a high temperature environment will cause the first washer 14 to expand more than either the shell 2 or screw 12 and to compress the second washer 16 whereby to reduce the size, i.e., cross-sectional area of the liquid path therethrough to reduce the amount of electrolyte escaping from the inside of the reference electrode as a result of the increase in pressure within the cell caused by the high temperature environment. On the other hand, a relatively low temperature environment will allow the first washer 14 to contract and to increase the size of the liquid path through the compressible porous washer 16 to enlarge the liquid path through the washer 16 while the pressure within the cell is reduced due to the low temperature environment. Thus, the outflow of electrolyte from the reference cell is automatically controlled, and the operating life of the reference cell is greatly extended by maintaining a relatively constant flow of electrolyte out of the reference cell over a wide temperature range.

In FIG. 2, there is shown a modified construction for the reference cell in a partial cross-sectional illustration omitting the parts of the reference cell similar to those previously shown in FIG. 1. An outer shell 20 is arranged to have an integral closed end 22 at one end thereof. The end 22 has a threaded tapered hole 24 therein in a portion of the end 22 having a substantially greater thickness than the rest of the shell 20. The threaded hole 24 is tapered for accommodating a so-called pipe plug 26. The center of the pipe plug 26 is provided with a hole 28 extending therethrough and having a cylinder 30 made of a high coefficient of thermal expansion material located therein and extending from one end of the pipe plug 26 to the other end surface thereof. The cylinder 30 is a light press fit within the cylindrical hole 28 to form a leakage path constituting a liquid junction along an outside surface of the cylinder 30. The cylinder 30 has a threaded hole 31 therein extending from the end of the cylinder 30 facing the inside of the shell 20 to a depth sufficient to accommodate a screw 32 having a head 33 with a diameter substantially greater than the diameter of the cylinder 30. The screw 32 is made from a low coefficient of thermal expansion material and is arranged to hold a compressible porous washer 34 between the head 33 of the screw 32 and the end of the pipe plug 26 inside of the shell 20. Since the cylinder 30 has a high coefficient of thermal expansion, it is effective to reduce the cross-sectional area of the leakage path between the cylinder 30 and the pipe plug 26 in the presence of a high temperature environment and to expand the cross-sectional area of the leakage path in the presence of a low temperature environment. Further, since the pipe plug 26 and the cylinder 30 are made of a high coefficient of thermal expansion material and the screw 32 is made of a low coefficient of thermal expansion material, the porous washer 34 will be squeezed between the head 33 of the screw 32 and the pipe plug 26 and the cylinder 30 to further reduce the cross-sectional area of the leakage path forming the liquid junction. In the event that it is undesired to have both the pipe plug 26 and the cylinder 30 of high coefficient of thermal expansion material, the pipe plug 26 may be of a low coefficient expansion material which has the added advantage of forcing the cylinder 30 to expand lengthwise thus producing a lengthwise working of the liquid junction formed between the cylinder 30 and the plug 26 to free the junction path from clogging. The threads between the shell 20 and the pipe plug 26 are filled with any suitable pipe joint compound to form a fluid-tight liquid seal.

In FIG. 3, there is shown a partial cross-sectional representation of the liquid junction end of a second modified reference cell with the conventional elements shown in FIG. 1 being omitted. An external shell 40 of a low coefficient of thermal external expansion material and a tapered threaded plug 42 of a material having a higher coefficient of thermal expansion are used to provide the temperature variable liquid junction path. The screw plug 42 is divided into a threaded body portion 44 and a tapered head portion 46. The shell 40 has an integral closed end at one end thereof with a threaded and countersunk hole 48 passing therethrough. The countersunk portion of the hole 48 is arranged to receive the tapered portion of the plug 42 while the threaded portion of the plug 42 is arranged to thread into the threaded portion of the hole 48. The liquid junction is formed between the tapered sides of the hole 48 and the plug 42 while the threaded portions of the hole 48 and the plug 42 are designed with a loose fit to allow electrolyte flow and to allow seating of the plug and hole tapers. The tapered surfaces may be roughened to allow a minute seepage of the electrolyte out of the reference electrode. With an increase in environmental temperature, a point on the tapered portion 46 of the plug 42 moves downward, i.e., with reference to the illustration, with respect to the body of the plug 42 but at the same time outwardly from the center line of the plug 42. By an appropriate selection of the taper angle and the difference in coefficient of thermal expansion of the shell 40 and the plug 42, the cross-section area of the liquid junction can be decreased or increased with a temperature rise of the environment surrounding the reference cell.

Accordingly, it may be seen that there has been provided, in accordance with the present invention, an improved pH reference electrode for automatically restricting the flow of electrolyte out of the reference electrode and including means for facilitating the cleaning of the liquid junction of the reference electrode.

The embodiments of the invention in which an exclusive property or privilege is claimed are defined as follows:

1. A pH reference electrode comprising:
   an electrically insulating shell forming a container for an electrolyte therein,
   electrode support means located within said shell at one end thereof, an electrode supported within said shell by said electrode support means, a threaded opening located in the other end of said shell, and threaded plug means positioned within said opening to form a liquid junction path defined in part by the threads of said threaded plug means and said threaded opening in said shell, said plug means having a coefficient of thermal expansion different from a coefficient of thermal expansion of said shell.

2. A pH reference cell as set in claim 1 wherein said threaded plug includes a surface adjacent to the threads on said threaded plug in contact with said shell and which has a roughened surface to provide a continuation of the liquid junction path.

3. A pH reference electrode comprising:

an electrically insulating shell having a first end and a second end, electrode support means located in said first end of said shell, electrode means supported within said shell by said electrode support means, a threaded hole in said second end of said shell, a threaded plug arranged to be located in said threaded hole to form a liquid junction path between said threaded plug and said threaded hole, said threaded plug and said shell having similar coefficients of thermal expansion, a first porous washer located between said threaded plug and said shell, said first washer providing a continuation of the liquid junction path, and a second washer located between said first washer and said threaded plug, said second washer having a higher coefficient of thermal expansion than either said shell or said threaded plug.

4. A pH reference electrode as set forth in claim 3 wherein said shell and said threaded plug are made of glass-filled polysulfone and said second washer is made of unfilled polytetrafluorethylene.

5. A pH reference electrode as set forth in claim 3 wherein said electrode support means includes a threaded hole in said first end of said shell, a threaded plug located in said threaded hole and means in said threaded plug for supporting said electrode means.

6. A pH reference electrode as set forth in claim 1 wherein said electrode support means includes a threaded hole in said first end of said shell, a threaded plug located in said threaded hole and means in said threaded plug for supporting said electrode means.

7. A pH reference electrode as set forth in claim 1 wherein said coefficient of thermal expansion of said plug means is greater than said coefficient of thermal expansion of said shell.

8. A pH reference electrode comprising:

an electrically insulating shell having a first end and a second end, an electrode support means located in said first end of said shell, an electrode means supported within said shell by said electrode support means, a threaded hole located in said second end of said shell, a threaded plug arranged to be located in said threaded hole to form a fluid-tight seal therewith, said plug having a longitudinal hole passing therethrough, a second plug positioned in said longitudinal hole and having a contacting surface with a surface of said longitudinal hole to form a liquid junction path, a threaded hole in an end of said second plug inside said shell, a retaining bolt in said last-mentioned threaded hole and a porous washer located between a head of said bolt and said end of said second plug, said washer overlying said liquid junction path and forming a continuation thereof, said first plug and said second plug being made of respective materials having different coefficients of thermal expansion.

9. A pH reference electrode as set forth in claim 8 wherein said porous washer and said bolt are made of respective materials having different coefficients of thermal expansion.

10. A pH reference electrode as set forth in claim 8 wherein said electrode support means includes a threaded hole in said first end of said shell, a threaded plug located in said threaded hole and means in said threaded plug for supporting said electrode means.

References Cited

UNITED STATES PATENTS

| | | | |
|---|---|---|---|
| 3,298,944 | 1/1967 | Luck | 204—195 F |
| 2,934,484 | 4/1960 | Anderson | 204—195 F |
| 3,208,928 | 9/1965 | Landers et al. | 204—195 F |
| 2,927,887 | 3/1960 | Proctor | 204—195 F |
| 2,387,727 | 10/1945 | Godshalk | 204—195 G |
| 3,455,793 | 7/1969 | Watanabe et al. | 204—195 F |

FOREIGN PATENTS

| | | | |
|---|---|---|---|
| 678,648 | 9/1952 | Great Britain | 204—195 F |

TA-HSUNG TUNG, Primary Examiner